US008561950B2

(12) United States Patent
Li

(10) Patent No.: US 8,561,950 B2
(45) Date of Patent: Oct. 22, 2013

(54) CABLE MANAGEMENT APPARATUS

(75) Inventor: Zhan-Yang Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 77 days.

(21) Appl. No.: 13/166,650

(22) Filed: Jun. 22, 2011

(65) Prior Publication Data
US 2012/0145837 A1 Jun. 14, 2012

(30) Foreign Application Priority Data

Dec. 8, 2010 (CN) .......................... 2010 1 0578854

(51) Int. Cl.
*F16L 3/08* (2006.01)
*F16L 3/12* (2006.01)
(52) U.S. Cl.
USPC ............................. 248/74.1; 248/74.2; 248/73
(58) Field of Classification Search
CPC ........ H02G 3/32; B60R 16/0215; F16M 1/00; F16M 2200/00; F16L 3/237; F16L 3/23; F16B 21/086
USPC ............... 248/74.1, 74.2, 65, 73, 68.1, 49, 71
See application file for complete search history.

(56) References Cited

U.S. PATENT DOCUMENTS

| 4,609,171 | A  | * | 9/1986  | Matsui ......................... 248/74.3 |
| 4,669,688 | A  | * | 6/1987  | Itoh et al. ..................... 248/74.2 |
| 4,958,792 | A  | * | 9/1990  | Rinderer ....................... 248/74.2 |
| 5,188,319 | A  | * | 2/1993  | Hawash et al. ............. 248/68.1 |
| 5,535,969 | A  | * | 7/1996  | Duffy, Jr. ..................... 248/68.1 |
| 5,820,048 | A  | * | 10/1998 | Shereyk et al. ............. 248/68.1 |
| 6,209,827 | B1 | * | 4/2001  | Kawai .............................. 248/73 |
| 6,923,407 | B2 | * | 8/2005  | Takeuchi ........................ 248/73 |
| 7,770,850 | B2 | * | 8/2010  | Allmann et al. ............. 248/68.1 |
| 8,286,923 | B2 | * | 10/2012 | Kobayashi et al. .......... 248/74.2 |
| 2001/0019091 | A1 | * | 9/2001 | Nakanishi ..................... 248/68.1 |
| 2007/0246614 | A1 | * | 10/2007 | Allmann et al. ................ 248/65 |
| 2012/0217355 | A1 | * | 8/2012 | Geiger et al. ................ 248/74.2 |

* cited by examiner

*Primary Examiner* — Nkeisha Smith
(74) *Attorney, Agent, or Firm* — Altis & Wispro Law Group, Inc.

(57) ABSTRACT

A quick-release cable management apparatus includes a securing board and cable management clip. Cables can very conveniently be secured in the clip, or removed from the clip, and the clip itself can be detached and remounted elsewhere very quickly. The securing board defines a securing hole. The cable management clip includes a base and a pressing member pivoting on the base. The base includes a sprung wedge located in the securing hole to lock the clip in place. The pressing member is adapted to rotate between a locking position and a unlocking position. In the locking position, the pressing member is locked with the base to form a cable management space between the pressing member and the base. In the unlocking position, the pressing member is unlocked with the base to open the cable management space.

10 Claims, 4 Drawing Sheets

CABLE MANAGEMENT APPARATUS

BACKGROUND

1. Technical Field

The present disclosure relates to cable management apparatuses, and more particularly to a cable management apparatus used in an electronic device.

2. Description of Related Art

Many electronic devices, such as computers, include a plurality of input and output cables. The input and output cables include power cables, data cables, communication lines, keyboard lines, and so on. It is therefore desirable to include some type of cable management apparatus, such as a binding accessory, that allows the various cables to be collected together and attached in a preferred position to improve the appearance of the electric device and save space in the chassis. However, conventional binding accessories are not suited for temporary use in securing cables, nor are they adapted for use in different locations.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
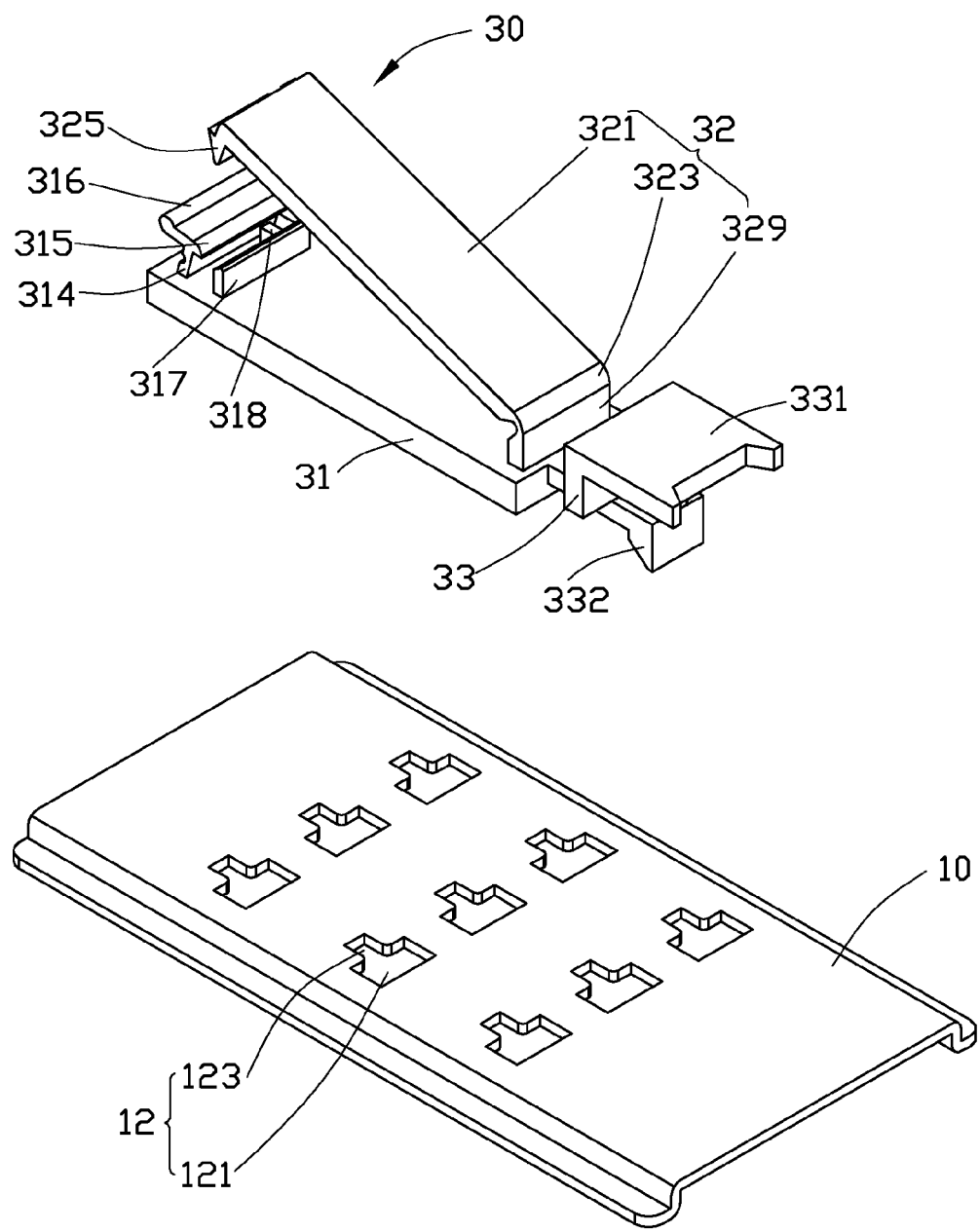
FIG. 1 is an isometric and exploded view of an embodiment of a cable management apparatus.
Figure 2:
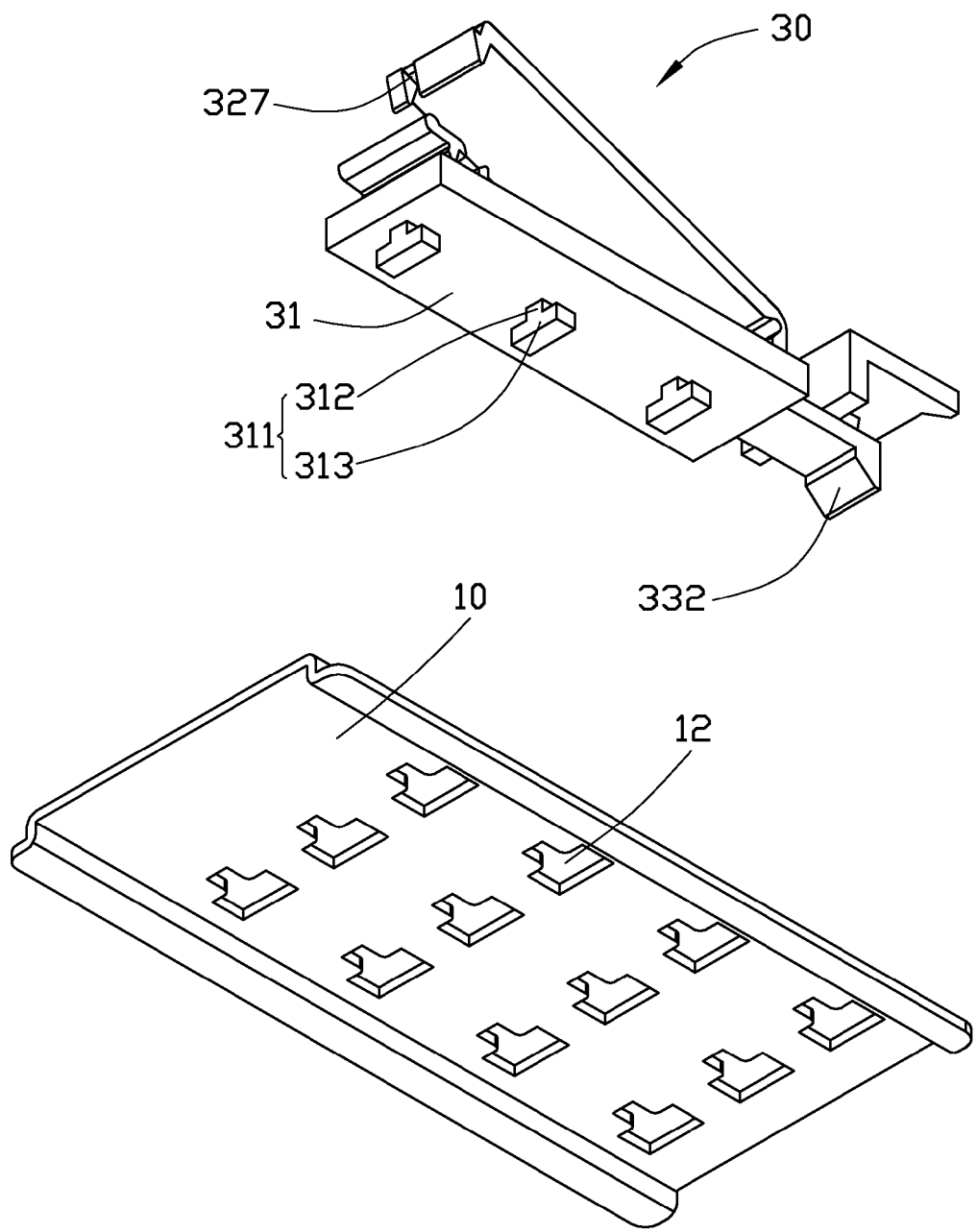
FIG. 2 is similar to FIG. 1, but viewed from another aspect.
Figure 3:
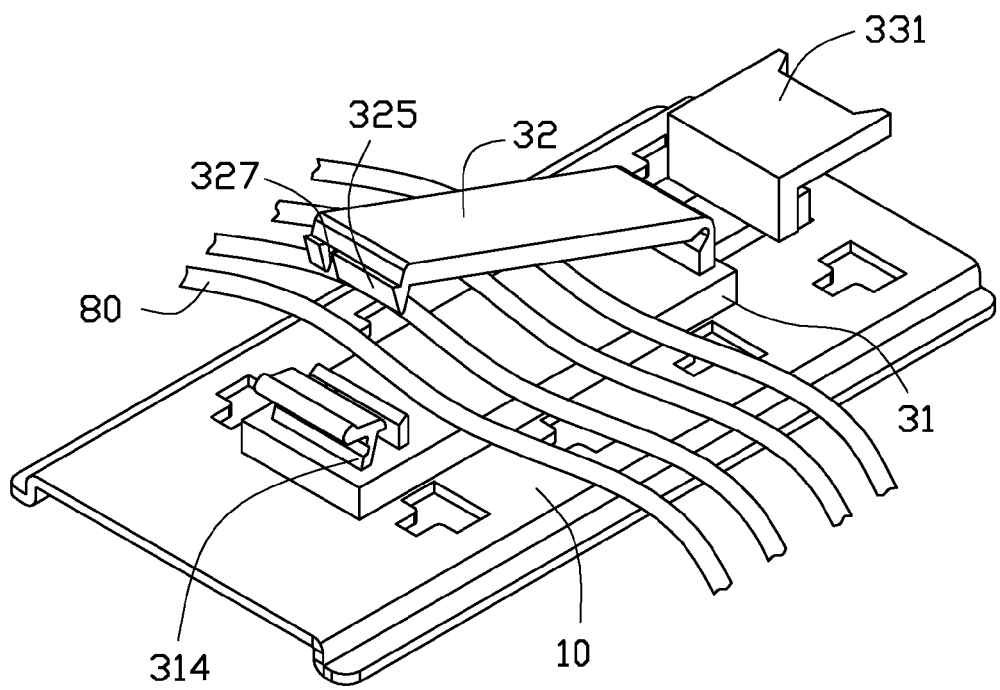
FIG. 3 is an in place view of the cable management apparatus of FIG. 1.
Figure 4:
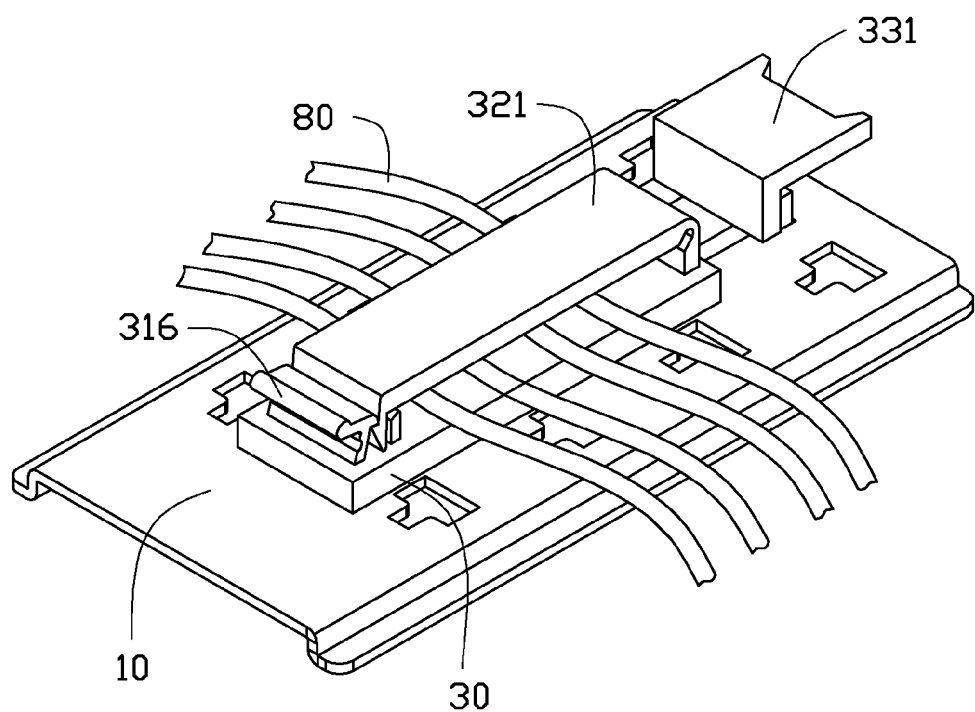
FIG. 4 is another in place view of the cable management apparatus of FIG. 1.

Referring to FIGS. 1 and 2, a cable management apparatus in accordance with an embodiment includes a securing board 10 and a first cable management clip 30.

The securing board 10 is substantially square in shape, which can be mounted in an electronic device which needs cable management. A plurality of securing holes 12 is defined in the securing board 10. Each securing hole 12 includes a wide receiving hole 121 and a narrow engagement hole 123.

The first cable management clip 30 includes a base 31 and a pressing member 32. The cable management clip 30 is secured on the securing board 10. The bottom surface of the base 31 has a plurality of securing blocks 311 located thereon. Each securing block 311 is substantially in the form of an inverted capital letter "T", and includes a sliding portion 312 and an engagement portion 313. The sliding portion 312 is connected to the bottom surface of the base 31. The engagement portion 313 is connected to the sliding portion 312. The scale of the sliding portion 312 is smaller than that of the engagement hole 123. The scale of the engagement portion 313 is larger than that of the engagement hole 123 but smaller than that of the receiving hole 121. A first clasp 314 and the pressing member 32 are located on the top surface of the base 31. The first clasp 314 includes a hook 315 and a pulling portion 316 connected to the hook 315. The pulling portion 316 is configured to be pulled down to move the hook 315. A limiting wall 317 is located on the top surface of the base 31 and adjacent the first clasp 314. A key or protrusion (protrusion 318) is situated between the first clasp 314 and the limit wall 317.

The pressing member 32 includes a pressing piece 321, a flexible portion 323, and a connection portion 329. The connection portion 329 is connected to the base 31. The flexible portion 323 acts as a hinge connecting the connection portion 329 and the pressing piece 321. The distal end of the pressing piece 321 is a hook or clasp (second clasp 325) which can be secured by the first clasp 314 of the base 31. The second clasp 325 has a keyway or cutout (cutout 327).

An auxiliary member 33 is connected to the end of the base 31 which is adjacent to the connection portion 329. The auxiliary member 33 includes a wedge 332 and a handle 331. By means of the handle 331, the wedge 332 is pulled up from the securing board 10.

Referring to FIGS. 1 to 4, in use, the securing board 10 is firstly secured at a proper position on or within an electronic device. The base 31 of the first cable management clip 30 is placed in an appropriate location on the securing board 10. The securing block 311 is inserted in the receiving hole 121. The sliding portion 312 of the securing block 311 is received in the receiving hole 121. The engagement portion 313 of the securing block 311 is located below the receiving hole 121. Then the base 31 is slid a short distance across the securing board 10. The sliding portion 312 moves from the receiving hole 121 into the engagement hole 123. The engagement portion 313 engages with a bottom of the securing hole 12. Simultaneously, the wedge 332 of the auxiliary member 33 finds itself inserted into another receiving hole 121 of the securing board 10, thus locking the base 31 longitudinally in place. By these means, the first cable management clip 30 is securely mounted on the securing board 10.

Then cables 80 are placed between the pressing piece 321 and the base 31. The pressing piece 321 rotates around the flexible portion 323. The protrusion 318 locates in the cutout 327. The second clasp 325 engages the hook 315 of the first clasp 314. Therefore, the cables 80 are kept in place between the pressing piece 321 and the base 31. The limit wall 317 separates the cables 80 from the hook 315 and the second clasp 325 and prevents damage to the cables 80.

When the cables 80 needs to be taken out of the first cable management clip 30, the pulling portion 316 is pulled to disengage the hook 315 from the second clasp 325. The pressing piece 321 rotates upwards and the cables 80 can be removed.

When the first cable management clip 30 needs to be detached from the securing board 10, the handle 331 is pulled up to disengage the wedge 332 from the receiving hole 121. The first cable management clip 30 then can be detached from the securing board 10.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cable management apparatus, comprising:
a securing board defining a securing hole; and
a cable management clip comprising a base and a pressing member pivotally mounted on the base, the base comprising a wedge, the wedge located in the securing hole, wherein the pressing member is adapted to rotate between a locking position and a unlocking position; in the locking position, the pressing member is locked with the base to form a cable management space between the pressing member and the base; and in the unlocking position, the pressing member is unlocked with the base, and to the cable management space is opened;
wherein the base comprises a first clasp, the first clasp comprises a hook, the pressing member comprises a second clasp, and the second clasp engages the hook in the locking position; and the base comprises a limit wall, and the limit wall separates the cable management space from the hook and the second clasp; a protrusion is located between the first clasp and the limit wall, the second clasp defines a cutout configured to separate the second clasp into two parts, and the protrusion is received in the cutout in the locking position.

2. The cable management apparatus of claim 1, wherein the first clasp further comprises a pulling portion, the pulling portion is connected to the hook, and the pulling portion is adapted to be pulled to move the hook.

3. The cable management apparatus of claim 1, wherein the pressing member comprises a pressing piece, a flexible portion, and a connection portion; the connection portion is connected to the base, the flexible portion connects the connection portion to the pressing piece, and the pressing piece is adapted to rotate around the flexible portion.

4. The cable management apparatus of claim 3, wherein the second clasp is located on a free end of the pressing piece.

5. The cable management apparatus of claim 1, wherein a handle is connected to the wedge, and the handle is adapted to be pulled to move the wedge.

6. A cable management apparatus, comprising:
a securing board; and
a cable management clip comprising a base and a pressing member, the base is mounted on the securing board, the pressing member is pivotally mounted on the base, the base comprises a first clasp and a limit wall, the pressing member comprises a second clasp; wherein the pressing member is adapted to rotate between a locking position and a unlocking position; in the locking position, the first clasp is engaged with the second clasp to form a cable management space between the pressing member and the base, and the limit wall separates the cable management space from the first clasp and the second clasp; and in the unlocking position, the first clasp is disengaged form the second clasp, and the cable management is opened; the first clasp comprises a pulling portion, and the pulling portion is adapted to be pulled to move the first clasp; wherein the securing board defines a securing hole, the base comprises a wedge, and the wedge is located in the securing hole; and wherein a protrusion is situated between the first clasp and the limit wall; and the second clasp defines a cutout to separate the second clasp into two parts, and the protrusion is received in the cutout in the locking position.

7. The cable management apparatus of claim 6, wherein a handle is connected to the wedge, and the handle is adapted to be pulled to move the wedge.

8. The cable management apparatus of claim 6, wherein the pressing member comprises a pressing piece, a flexible portion, and a connection portion; the connection portion is connected to the base, the flexible portion connects the connection portion to the pressing piece, and the pressing piece is adapted to rotate around the flexible portion.

9. The cable management apparatus of claim 8, wherein the second clasp is located on a free end of the pressing piece.

10. A cable management apparatus, comprising:
a securing board defining a securing hole; and
a cable management clip comprising a base and a pressing member pivotally mounted on the base, the base comprising a wedge, the wedge located in the securing hole, wherein the pressing member is adapted to rotate between a locking position and a unlocking position; in the locking position, the pressing member is locked with the base to form a cable management space between the pressing member and the base; and in the unlocking position, the pressing member is unlocked with the base, and to the cable management space is opened;
wherein the base comprises a first clasp, the first clasp comprises a hook, the pressing member comprises a second clasp, and the second clasp engages the hook in the locking position; and the base comprises a limit wall, and the limit wall separates the cable management space from the hook and the second clasp; the first clasp further comprises a pulling portion, the pulling portion is connected to the hook, and the pulling portion is adapted to be pulled to move the hook and wherein a protrusion is situated between the first clasp and the limit wall; and the second clasp defines a cutout to separate the second clasp into two parts, and the protrusion is received in the cutout in the locking position.

\* \* \* \* \*